March 17, 1959     F. L. COCKLIN     2,877,795
BRAKE CONTROL MEANS FOR MOTOR DRIVEN VEHICLES
Filed March 15, 1956

INVENTOR.
Forest L. Cocklin
BY
Frease & Bishop
ATTORNEYS

United States Patent Office 2,877,795
Patented Mar. 17, 1959

2,877,795

BRAKE CONTROL MEANS FOR MOTOR DRIVEN VEHICLES

Forest L. Cocklin, Canton, Ohio

Application March 15, 1956, Serial No. 571,765

6 Claims. (Cl. 137—593)

The invention relates to brake control means for motor driven vehicles, and has more particular reference to vehicles provided with four-wheel hydraulic brakes and having differential-driven rear wheels, the invention consisting broadly in means for temporarily rendering the front wheel brakes inoperative, whereby the rear wheel brakes only may be applied while the rear wheels are being driven through the differential by the motor.

It is well known that it is frequently very difficult, if not impossible, to start an automobile when the rear wheels are standing upon ice or snow, or in mud, due to the fact, because of the differential between the rear wheels and the motor, one rear wheel may spin while the other rear wheel remains stationary.

Applicant has found that by applying the rear wheel brakes only at such a time, the power from the wheel which has a tendency to spin is transferred, through the braking action, to the other rear wheel, causing both rear wheels to rotate so as to move the car upon the road.

It is also a well known fact that, if four-wheel brakes are applied while a car is being driven upon an icy or slippery road, the front wheels will immediately start to slide upon the road, nullifying their steering function and frequently causing the car to skid. Applicant has also discovered that this danger may be avoided or greatly reduced by applying only the rear wheel brakes under such conditions.

It is therefore an object of the invention to provide brake control means upon an automobile, for overcoming the above-named disadvantages and difficulties and for promoting safety.

Another object is to provide means upon a motor vehicle, having differential-driven rear wheels, for temporarily rendering the front wheel brakes inoperative so that the rear wheel brakes only may be applied while the rear wheels are operatively connected to the motor through the differential.

A further object is to provide such means including a valve located between the master cylinder and the front wheel brakes and means for operating said valve.

A still further object is to provide means of the character referred to in which the valve is a magnetic valve adapted to be controlled by a manually operable switch.

The above objects together with others which will be apparent from the drawing and following description, or which may be later referred to, may be attained by constructing the invention in the manner illustrated in the accompanying drawing and hereinafter described in detail.

In general terms, the invention may be described as applied to a motor-driven vehicle having a differential gearing interposed between the motor and the rear wheels, with a conventional hydraulic four-wheel brake system operatively associated therewith.

The invention includes a magnetic valve located between the master cylinder of the hydraulic brake assembly and the front wheel brakes, a switch being located in an electric circuit connecting the battery with said magnetic switch.

In operation, the switch may be manually operated to temporarily render the front wheel brakes inoperative, whereby the rear wheel brakes only may be applied while the rear wheels are operatively connected, through the differential, with the motor.

Having thus briefly described the construction and purpose of the invention, reference is now made to a preferred embodiment of the invention illustrated in the drawing, in which.

Referring now more particularly to the embodiment of the invention shown in the drawing, in which similar numerals refer to similar parts throughout, the power system and hydraulic brake system of a motor vehicle are diagrammatically shown in Fig. 1.

Figure 1:
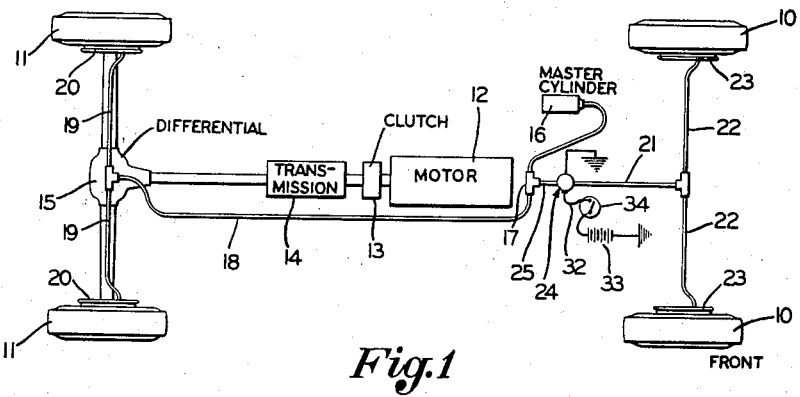
Fig. 1 is a diagrammatic plan view of the power system and hydraulic brake system of a motor-driven vehicle, showing the invention applied thereto.

The front and rear wheels of the vehicle are indicated at 10 and 11 respectively. Power is adapted to be furnished to the rear wheels 11 in conventional manner by a motor indicated at 12 and adapted to be connected, through the usual clutch 13, with the transmission indicated at 14.

As in usual practice, the rear wheels 11 of the vehicle are connected, through the differential 15, with the transmission 14, so that they may be independently driven when the transmission is operatively connected to the motor through the clutch.

The hydraulic brake system includes the master cylinder 16, connected as through the T-coupling 17, with the tubing 18 and 19 leading to the rear wheel brakes 20, and also through the T-coupling 17 with the tubing 21 and 22 leading to the front wheel brakes 23.

All of the above-described mechanism may be of any usual and conventional construction and arrangement. The invention comprises means interposed between the master cylinder 16 and the front wheel brakes 23 for rendering the front wheel brakes inoperative, without in any manner interfering with the normal operation of the rear wheel brakes.

This means is shown as a magnetic valve, indicated generally at 24, connected on one side to the master cylinder as by the tubing 25 communicating with the T-coupling 17, and connected at its other side, through the tubing 21, with the tubing 22 leading to the front wheel brakes.

Figures 2, 3:
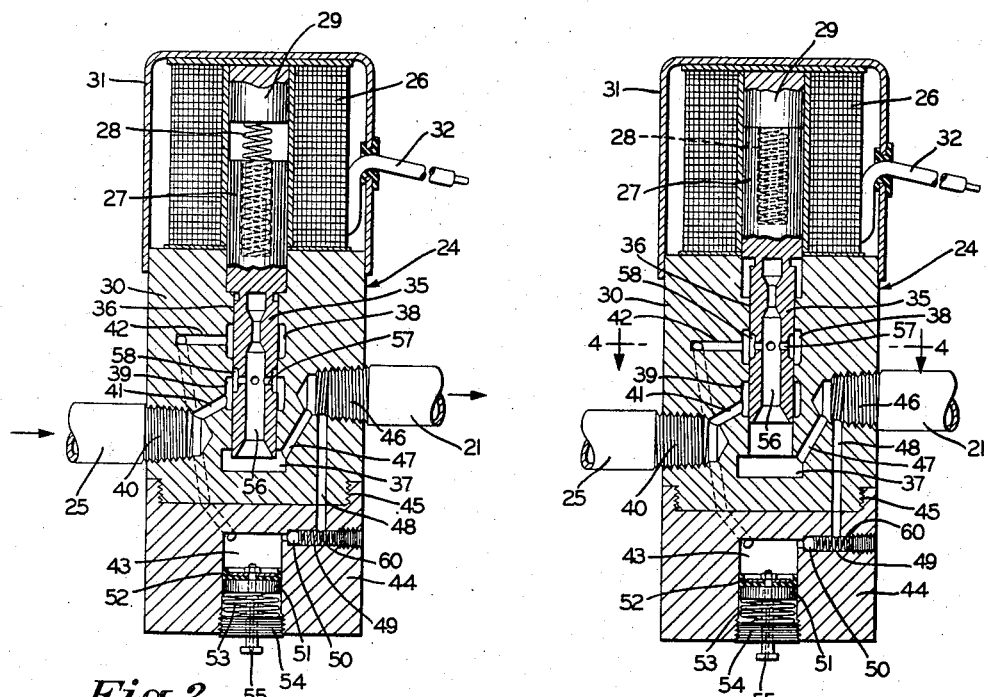
Fig. 2 is an enlarged vertical sectional view of a magnetic valve for optionally controlling the front wheel brakes, showing the valve in normal position.
Fig. 3 is a view similar to Fig. 2, showing the valve in the operated position to render the front wheel brakes inoperative.
Figure 4:
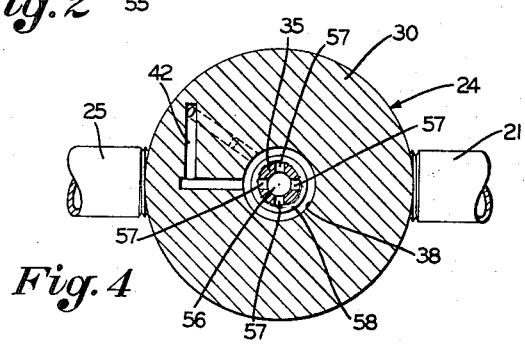
Fig. 4 is a transverse sectional view through the magnetic valve, taken as on the line 4—4, Fig. 3.

The magnetic valve is provided with an operating magnet in the form of a solenoid or tubular coil 26, having the armature 27 slidably located therein and normally held in the lowered or extended position, shown in Fig. 2, as by the coil spring 28. The lower portion of the coil spring 28 is located within an axial bore in the armature 27, and the upper end thereof is in contact with the plug 29 stationary within the upper end of the coil 26.

The magnet is shown as mounted upon the upper end of the valve body 30 and is enclosed within the housing 31 attached thereto. A wire 32 connects the magnet to the automobile battery 33, a switch 34 being interposed in the circuit between the magnet and the battery.

This switch may be located upon the instrument panel, or any other point convenient to the driver, and is preferably a manually operated switch of the type that will be automatically opened at a predetermined time after it is closed.

The valve piston 35 is rigidly attached to, or formed integrally with, the armature or plunger 27 of the magnet and is slidably mounted in the vertical bore 36 extending from the upper end of the valve body 30 to a point near the lower end thereof where it is enlarged as at 37.

Spaced annular recesses 38 and 39 surround and communicate with the vertical bore 36 in the valve body 30 and are located at points intermediate the ends of said bore.

The tubing 25, leading from the master cylinder, is attached to the valve body 30 as by the pipe threads 40 and communicates, through the passage 41 in the valve body, with the lowermost annular recess 39.

The uppermost annular recess 38 communicates, through the passage 42 in the valve body, with the accumulator chamber 43 in the lower portion 44 of the valve body, which as shown in Figs. 2 and 3, may be a separate part attached to the lower end of the valve body proper as by screw threads 45.

The tubing 21, leading to the front wheel brakes, is attached to the valve body 30 as by the screw threads 46. A passage 47 in the valve body 30 provides communication between the tubing 21 and the enlarged lower end 37 of the bore 36 in the valve body.

The tubing 21 also communicates, through the vertical passage 48, with the horizontal passage 49 in the lower portion 44 of the valve body. The passage 49 communicates with the accumulator chamber 43, a spring-loaded check valve 50 preventing fluid from passing from the tubing 21 through the passages 48 and 49 to the accumulator chamber.

A piston 51 is slidably mounted within the accumulator chamber and provided with the rubber cup 52, a coil spring 53 being interposed between the piston and the screw plug 54 for normally urging the piston upward in the accumulator chamber. A vent may be provided, as indicated at 55, to prevent the compression of air below the piston.

The valve piston 35 is provided with a central bore 56 open through the lower end thereof and communicating through the radial ports 57 with the annular groove 58 in the periphery of the valve piston.

With the parts in the normal, unoperated position, as shown in Fig. 2, fluid from the master cylinder 16 is admitted through the tubing 25 to the valve body 30 and flows through the passage 41, annular recess 39, annular recess 58, radial ports 57 and central bore 56 through the lower end of the valve piston to the enlarged portion 37 of the vertical bore in the valve body and then through the passage 47 to the tubing 21 leading to the front wheel brakes 23.

When it is desired to temporarily render the front wheel brakes inoperative, so that the rear wheel brakes may be applied at the same time that power from the motor is applied to the rear wheels through the differential, the switch 34 may be closed, energizing the magnet coil 26 and pulling the armature or plunger 27 upward to the position shown in Fig. 3.

In this position it will be seen that the valve piston 35 is raised, moving the annular groove 58 thereof into communication with the upper annular recess 38 in the bore 36 of the valve body, thus cutting off communication between the master cylinder and the front wheel brakes.

In this position of the valve piston, fluid may pass from the front wheel brakes through the tubing 21 and through the passage 47 in the valve body to the enlarged lower end 37 of the vertical bore 36 therein, thence upward through the bore 56 in the valve piston, then through the radial ports 57, annular groove 58 and upper annular recess 38 through the passage 42 to the accumulator chamber 43, releasing the fluid pressure from the front wheel brakes and rendering them inoperative.

When the switch 34 is again opened, the parts will return to the position shown in Fig. 2, connecting the master cylinder with the front wheel brakes. At this time fluid accumulated in the accumulator chamber 43 will be discharged therefrom, due to the fact that the coil spring 53 is heavier than the coil spring 60, thus dislodging the check valve 50 from its seat and permitting fluid to pass from the accumulator chamber through the passages 49 and 48 to the tubing 21 communicating with the front wheel brakes.

From the above it will be obvious that a simple and easily operated means is provided for rendering the front wheel brakes inoperative while permitting operation of the rear wheel brakes. This enables the driver to apply the rear wheel brakes only, while the rear wheels are being power driven through the differential.

In the event the car is upon ice, snow or mud, or other slippery road surfaces, the rear wheel brakes may be applied at the same time that power is applied to the rear wheels through the differential. The driving wheels thus being braked, neither wheel will be permitted to spin and both wheels may be rotated to move the car.

In the same manner, when driving upon a slippery road, if it is necessary to apply the brakes in order to reduce the speed of the car, the switch 34 may be closed so as to render the front wheel brakes inoperative, permitting the rear wheel brakes only to be applied, thus giving the driver greater control of the car and permitting him to steer the front wheels and avoid danger of skidding.

Although the invention has been illustrated and described as applied to a car having rear wheel drive, it should be understood that it is also applicable to a car having only front wheel drive, in which case the rear wheel brakes would be temporarily rendered inoperative, while the driving wheel brakes only would be applied at the same time that power was applied to the wheels.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A magnetic valve comprising a valve body having a longitudinal bore therein terminating near one end of the valve body, a solenoid at the other end of the valve body, an armature slidable in the solenoid, a valve piston connected to the armature and slidable in said longitudinal bore, fluid inlet and outlet means in the valve body, said inlet means communicating with an intermediate portion of said longitudinal bore and said outlet means communicating with the terminal end of said bore, an accumulator chamber in the valve body, a passage providing communication between said accumulator chamber and said longitudinal bore, a passage connecting the outlet means and said accumulator chamber, a check valve in said last-named passage, spring means normally holding the valve piston in position to provide communication through said longitudinal bore from the inlet means to the outlet means, the valve being so constructed that when said inlet means and said outlet means are connected, said first-named passage is cut off from both the inlet means and the outlet means, and means for energizing said solenoid to move the valve piston to position to shut off communication between the inlet and outlet means and to provide communication through said longitudinal bore and said first-named passage from the outlet means to the accumulator chamber.

2. A magnetic valve as set forth in claim 1, including a spring-loaded piston in the accumulator chamber for dislodging said check valve when said valve piston is in the position in which the solenoid is deenergized.

3. A magnetic valve as set forth in claim 1, in which the valve piston is provided with a central bore open toward the terminal end of said longitudinal bore, and a radial port communicating with said central bore and adapted to alternately communicate with the inlet means and with said first-named passage.

4. A magnetic valve as set forth in claim 1, in which the terminal end of said longitudinal bore is enlarged.

5. A magnetic valve as set forth in claim 1, in which spaced annular recesses in said longitudinal bore communicate with said first-named passage and said inlet means respectively, and in which the valve piston is provided with a central bore open toward the terminal end of said longitudinal bore, and with an annular groove and radial ports communicating with said central bore and said annular groove, said annular groove being adapted to alternately communicate with said spaced annular recesses.

6. A magnetic valve as set forth in claim 4, in which the outlet means communicates with said enlarged end of the terminal bore.

References Cited in the file of this patent

UNITED STATES PATENTS

| | | |
|---|---|---|
| 2,289,563 | Wood et al. | July 14, 1942 |
| 2,466,837 | Bohr | Apr. 12, 1949 |
| 2,750,962 | Kreitchman et al. | June 19, 1956 |